H. J. GILBERT.
PULLEY.
APPLICATION FILED MAY 4, 1906.
1,025,264.
Patented May 7, 1912.
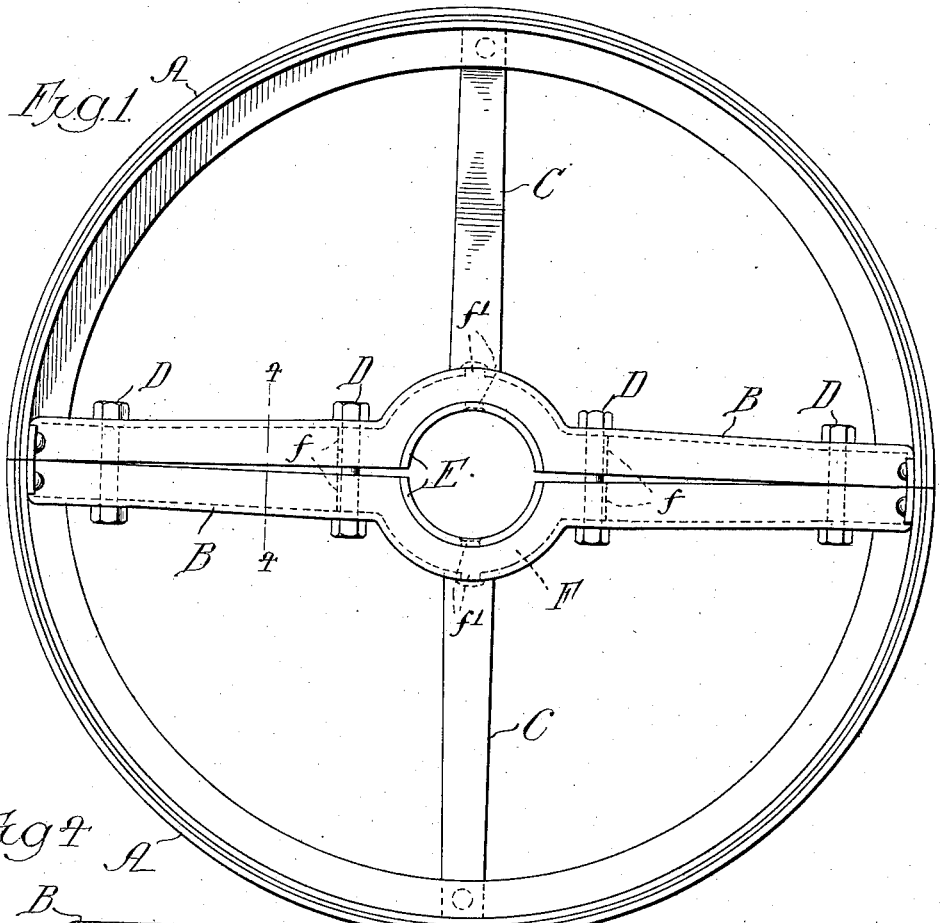
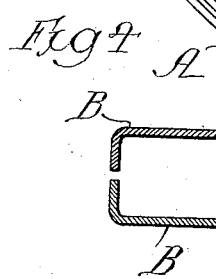
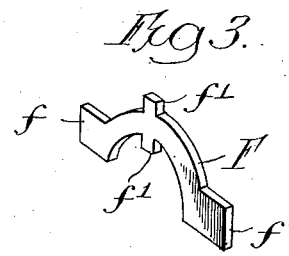

UNITED STATES PATENT OFFICE.

HENRY J. GILBERT, OF SAGINAW, MICHIGAN.

PULLEY.

1,025,264.    Specification of Letters Patent.    Patented May 7, 1912.

Original application filed March 8, 1904, Serial No. 197,072. Divided and this application filed May 4, 1906. Serial No. 315,165.

*To all whom it may concern:*

Be it known that I, HENRY J. GILBERT, a citizen of the United States, residing at Saginaw, county of Saginaw, and State of Michigan, have invented certain new and useful Improvements in Pulleys, of which the following is a specification.

My invention pertains to pulleys and the like and more particularly to pulleys made of sheet metal and the object thereof is to produce a pulley of this character so constructed and arranged as to possess the elements of strength, rigidity and durability.

The various features of improvement and advantage of my pulley construction will be apparent from the description hereinafter given.

In the accompanying drawing, Figure 1 is a side elevation of a pulley embodying my improvements; Fig. 2 a sectional elevation of the hub portion of one of the pulley halves or sections, the section being taken longitudinally of the spoke arm; Fig. 3 a perspective of the strengthening piece or plate illustrated in Figs. 1 and 2 in association with the other parts of the pulley structure; and Fig. 4 a cross section of one of the spoke arms.

The same reference characters are used to indicate corresponding parts in the several views.

Referring to the present embodiment of my invention, the pulley is of the usual two-part or two-section construction, having the two semi-circular rim segments A, A which abut at their meeting ends to form the complete circular rim and also having the two parallel spoke arms B, B which are secured at their ends to the rim structure in any suitable manner so far as my present invention is concerned. In addition to the spoke arms B, strengthening spoke arms C, C at right angles to the main spoke arms may be employed, such arms C, C being connected at their ends, respectively, with the rim structure and with the hub portion of the main spoke arms.

The main spoke arms B, B are U-shaped in cross section, as indicated in Fig. 4 and are provided at their middle with curved hub portions forming a shaft bore or opening and two portions extending substantially radially therefrom to the point or place of attachment thereof to the rim segments. The main spoke arms which are slightly separated from each other, are clamped together and upon a shaft (either directly or through the medium of a bushing) by means of clamping bolts D, D. In the present instance, I provide the shaft opening or bore with a hub thimble E of the split type.

The purpose of my present invention is to provide novel and efficient means for strengthening the hub portion of the spoke arms and resisting the crushing pressure which is incident to the clamping of the spoke arms onto the shaft and tends to flatten the hub portion, especially when the latter is extended longitudinally, that is in the direction of the axis of rotation. To this end, I provide the hub portion of each of the main spoke arms B, B with a strengthening plate F which is of the irregular shape illustrated in Fig. 3, each plate being interposed in the annular space between its half of the thimble E and the shaft bore of its spoke arms which are concentric with each other. This strengthening plate presents its edges, respectively, to the inner face of the hub portion of the spoke arm and the outer face of the half thimble, if a thimble is employed.

As herein shown, each strengthening plate has an arched central portion so as to be saddled upon its half thimble and also has rectangular ends *f* arranged to fit beneath the flattened surface of its spoke arm, and, by preference, to extend slightly beyond the line of the clamping bolts, all as clearly illustrated in Fig. 2. These strengthening plates are secured to the spoke structure and preferably also to the half thimbles, in suitable manner, as for instance by means of the oppositely extending lugs *f'* located at the center of the strengthening plates and passing through holes in the spoke structure and bushing, respectively, such projections or lugs being headed down in the manner of riveters. It is obvious from this description that these strengthening plates effectually maintain the concentric relationship between the thimble and the hub portion of the hub structure and thereby prevent a crushing in or flattening of such hub portion when the clamping bolts are tightened.

I claim:

1. In a pulley, the combination, with a rim, of a pair of spoke arms connected therewith, the central portion of such spoke arms being outwardly curved to form the shaft bore or hub portion of the pulley, and strengthening plates each having a central portion curved to correspond with the shaft opening or hub portion of the pulley and end portions arranged to bear against the inner face of the spoke arms at points beyond the hub portions thereof; substantially as described.

2. In a pulley, the combination, with a rim, of a pair of spoke arms connected therewith, the central portion of such spoke arms being outwardly curved to form the shaft bore or hub portion of the pulley, and strengthening plates each having a central curved portion corresponding to the hub portion and having ends arranged to bear against the inner face of the spoke arms at points beyond the hub portions thereof, said central portion of each strengthening plate being secured to the hub portion of its spoke arm, substantially as described.

3. In a pulley, the combination of a rim, a hub thimble, a pair of spoke arms having straight end portions and a central portion outwardly curved so as to be substantially concentric with the hub thimble, and plates, each having a curved part arranged between said thimble and the curved portion of the spoke arms and having end portions arranged beneath the straight portions of the spoke arms; substantially as described.

4. In a pulley, the combination of a rim, a pair of spoke arms connected therewith, the central portion of such spoke arms being outwardly curved to form the hub portion of the pulley, and strengthening plates positioned transversely of the pulley axis and consisting of plates placed on edge with their outer edges bearing upon the inner faces of the hub portion, said hub portions having rivet holes and said plates having projections $f'$ adapted to pass through said holes to form rivets; substantially as described.

5. In a pulley, the combination of a rim, a pair of spoke arms connected therewith, the central portion of such spoke arms being outwardly curved to form the hub portion of the pulley, and strengthening plates positioned transversely of the pulley axis and consisting of plates placed on edge with their outer edges bearing upon the inner faces of the hub portion, said plates having projections $f'$ on opposite edges, and a hub thimble which together with said hub portion have holes to receive said projections; substantially as described.

HENRY J. GILBERT.

Witnesses:
 EDWARD RECTOR,
 LOUIS B. ERWIN.